United States Patent
Noponen (10) Patent No.: US 12,034,190 B2
(45) Date of Patent: Jul. 9, 2024

(54) TEMPERATURE CONTROL SYSTEM FOR SOLID OXIDE CELLS AND METHOD OF ITS USE

(71) Applicant: Elcogen Oy, Vantaa (FI)

(72) Inventor: Matti Noponen, Espoo (FI)

(73) Assignee: ELCOGEN OY, Vantaa (FI)

( * ) Notice: Subject to any disclaimer, the term of this patent is extended or adjusted under 35 U.S.C. 154(b) by 0 days.

(21) Appl. No.: 18/554,293

(22) PCT Filed: Apr. 21, 2021

(86) PCT No.: PCT/FI2021/050303
§ 371 (c)(1),
(2) Date: Oct. 6, 2023

(87) PCT Pub. No.: WO2022/223870
PCT Pub. Date: Oct. 27, 2022

(65) Prior Publication Data
US 2024/0088409 A1  Mar. 14, 2024

(51) Int. Cl.
*H01M 8/04007* (2016.01)
*H01M 8/021* (2016.01)
(Continued)

(52) U.S. Cl.
CPC ....... *H01M 8/04059* (2013.01); *H01M 8/021* (2013.01); *H01M 8/0228* (2013.01); *H01M 8/0267* (2013.01); *H01M 8/1246* (2013.01); *H01M 2008/1293* (2013.01); *H01M 2300/0071* (2013.01); *H01M 2300/0074* (2013.01)

(58) Field of Classification Search
CPC . H01M 2008/1293; H01M 2300/0071; H01M 2300/0074
See application file for complete search history.

(56) References Cited

U.S. PATENT DOCUMENTS

| | | | |
|---|---|---|---|
| 2007/0042254 A1* | 2/2007 | Wozniczka | H01M 8/2404 29/623.2 |
| 2007/0092781 A1* | 4/2007 | Potnis | H01M 8/2432 429/495 |
| 2017/0162884 A1* | 6/2017 | Shimada | H01M 8/0232 |

FOREIGN PATENT DOCUMENTS

CN    1339181 A    3/2002

OTHER PUBLICATIONS

International Preliminary Report on Patentability (PCT/IPEA/409) issued on Mar. 13, 2023, for International Application No. PCT/FI2021/050303.

(Continued)

*Primary Examiner* — Matthew W Van Oudenaren
(74) *Attorney, Agent, or Firm* — BUCHANAN INGERSOLL & ROONEY PC (57) ABSTRACT

A temperature control system is disclosed for solid oxide cells, a cell including a fuel side, an oxygen rich side, and an electrolyte element, and the system including a repetitious unit structure for the solid oxide cells. The system includes a fuel flow field plate structure for fuel, an oxidant flow field plate structure for oxidant, electric contacting structures for the fuel and the oxidant and a temperature control fluid structure located in the flow field plate separately between the fuel flow field plate structure and the oxidant flow field plate structure. The temperature control system includes sealing structures to prevent leakages, and controls operation temperature in the solid oxide cells.

7 Claims, 6 Drawing Sheets

(51) Int. Cl.
    *H01M 8/0228*     (2016.01)
    *H01M 8/0267*     (2016.01)
    *H01M 8/12*     (2016.01)
    *H01M 8/1246*     (2016.01)

(56) References Cited

OTHER PUBLICATIONS

International Search Report (PCT/ISA/210) and Written Opinion (PCT/ISA/237) mailed on Mar. 28, 2022, by the European Patent Office as the International Searching Authority for International Application No. PCT/FI2021/050303.
Response to Written Opinion dated Feb. 17, 2023, for International Application No. PCT/FI2021/050303.

* cited by examiner

TEMPERATURE CONTROL SYSTEM FOR SOLID OXIDE CELLS AND METHOD OF ITS USE

THE FIELD OF THE INVENTION

Most of the energy of the world is produced by means of oil, coal, natural gas or nuclear power. All these production methods have their specific problems as far as, for example, availability and friendliness to environment are concerned. As far as the environment is concerned, especially oil and coal cause pollution when they are combusted. The problem with nuclear power is, at least, storage of used fuel.

Especially because of the environmental problems, new energy sources, more environmentally friendly and, for example, having a better efficiency than the conventional energy sources, have been developed.

Solid oxide cells operate via a chemical reaction in an environmentally friendly process and are very promising future energy conversion devices.

The intermittency of renewable energy sources has introduced challenges for the electrical grid stability, calling for increased demand and supply side flexibility and new energy storage and conversion technologies.

THE STATE OF THE ART

An electrochemical active solid oxide cell can be used as a fuel cell or an electrolyser. A fuel cell produces electricity and heat from various fuels and an electrolysis cell produces chemicals such as hydrogen, methane, ammonia and carbon monoxide from steam, CO2, and nitrogen, electricity and heat. Such a cell that operates in both modes, as a fuel cell and electrolyser, is called a solid oxide electrochemical cell (SOEC) or reversible solid oxide cell (rSOC) or simply a solid oxide cell (SOC).

Figure 1:
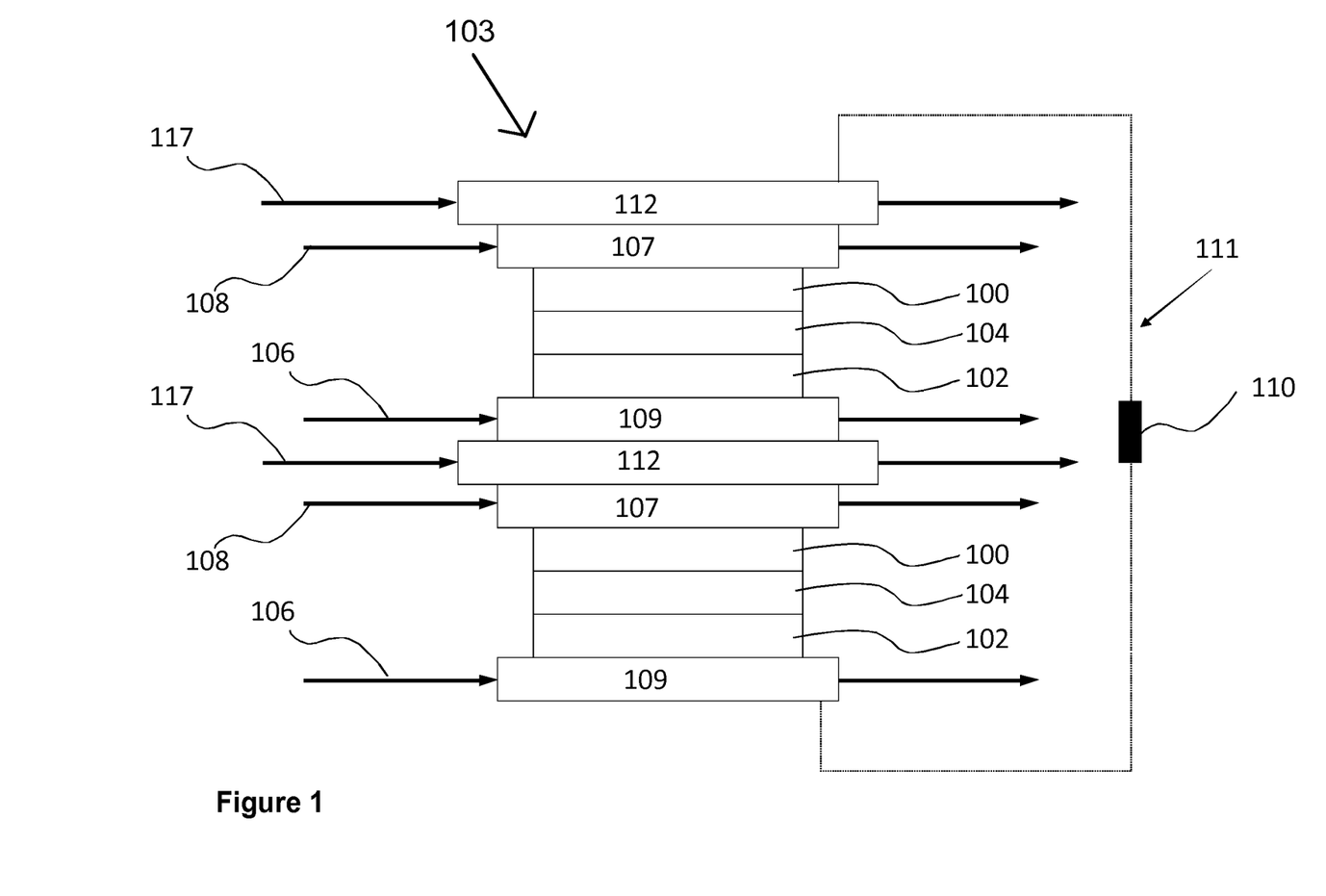
FIG. 1 presents exemplary repetitious cell structure.

Solid oxide cell (SOC), as presented in FIG. 1, comprises a fuel side 100 and an oxygen rich side 102 and an electrolyte material 104 between them. In solid oxide fuel cells (SOFCs), oxygen 106 is fed to the oxygen rich side 102 and it is reduced to a negative oxygen ion by receiving electrons from the oxygen rich side. The negative oxygen ion is transported through the electrolyte material 104 to the fuel side 100 where it reacts with fuel 108 producing typically water and carbon monoxide (CO) and carbon dioxide (CO2). Fuel side 100 and oxygen rich side 102 are connected through an external electric circuit 111 comprising a load 110 for the fuel cell operating mode withdrawing electrical energy out of the system. The fuel cells also produce heat to the reactant exhaust streams. In electrolysis operating mode, current flow is reversed and the solid oxide cells act as a load to which electricity is supplied. Depending on electrolysis reaction operating conditions, the cell operation can be endothermic, exothermic or thermoneutral.

Fuel cell reactions in the case of methane, carbon monoxide and hydrogen fuel are shown below:

Fuel side:

Oxygen rich side:

Net reactions:

In electrolysis operating mode (solid oxide electrolysis cells, (SOEC)) the reaction is reversed, i.e. electrical energy from a source 110 is supplied to the cell where water and often also carbon dioxide are reduced in the fuel side forming oxygen ions, which move through the electrolyte material to the oxygen rich side where oxidation reaction takes place. It is possible to use the same solid oxide cell in both SOFC and SOEC modes.

Prior art solid oxide electrolyser cells operate at temperatures which allow high temperature electrolysis reaction to take place, said temperatures being typically between 500-1000° C., but even over 1000° C. temperatures may be useful. These operating temperatures are similar to those conditions of the solid oxide fuel cells (SOFCs). The net cell reaction produces hydrogen and oxygen gases. The reactions for one mole of water are shown below:

Fuel side:

Oxygen rich side:

Net Reaction:

In case of co-electrolysis, a carbonaceous species is supplied to the cell in addition to steam, typically in proportions favorable for subsequent refining of the result gas according to e.g. the Fischer-Tropsch process. Carbon dioxide can be directly reduced to carbon monoxide or can interact with hydrogen through the water-gas shift reaction to form carbon monoxide and steam. Solid oxide cell can be used also to produce other types of chemicals directly by the electrochemical reactions or through chemical reactions. Such chemicals may include e.g. methane and ammonia. Methane can be produced when steam and carbonaceous species are fed to a solid oxide electrolysis cell and ammonia when steam and nitrogen are fed. The reaction rate of the chemical production is dependent on the supplied current, fuel and air side flow rates, fuel and air side gas concentrations, fuel and air side pressures, and fuel and air side temperatures.

In Solid Oxide Fuel Cell (SOFC) and Solid Oxide Electrolyser (SOE) stacks where the flow direction of the fuel side gas are relative to the oxygen rich side gas internally in each cell as well as relative to the flow directions of the gases between adjacent cells, stacks are combined through different cell layers of the stack. Further, the fuel side gas or the oxygen rich side gas or both can pass through more than one cell before it is exhausted and a plurality of gas streams can be split or merged after passing a primary cell and before passing a secondary cell. These combinations serve to increase the current density and minimize the thermal gradients across the cells and the whole stack.

The high operating temperature in the SOC cells and system introduce material related challenges with respect to thermomechanical forces, material properties, chemical stability and uniformity of operating conditions. These aspects place practical constraints on feasible SOC cell, stack and module sizes. Scaling the technology for large installations, typical to SOEC application, will thus primarily rely on multiplication of cells, stacks and SOC modules. Minimizing the cost of each multiplying unit at all levels is thus crucial for reducing the overall cost.

A SOFC delivers in normal operation a voltage of approximately 0.8V and an typical operation voltage of a SOE cell is about 1.3V. In order to increase the total voltage output, the SOCs are usually assembled in stacks in which the cells are electrically connected via flow field plates (also:

interconnector plates, bipolar plates). The desired level of voltage determines the number of cells needed.

Bipolar plates separate the anode and cathode sides of adjacent cell units and at the same time enable electron conduction between anode and cathode. Interconnects, or bipolar plates are normally provided with a plurality of channels for the passage of fuel gas on one side of an interconnect plate and oxidant gas on the other side. The flow direction of the fuel gas is defined as the substantial direction from the fuel inlet portion to the fuel outlet portion of a cell unit. Likewise, the flow direction of the oxidant gas (i.e. air), is defined as the substantial direction from the inlet portion to the outlet portion of a cell unit.

Conventionally, the cells are stacked one on top of each other with a complete overlap resulting in a stack with for instance co-flow having all fuel and oxidant inlets on one side of the stack and all fuel and oxidant outlets on the opposite side. One feature affecting the temperatures of the structure in operation is steam reformation of the fuel that is fed into the cell. Steam reformation is endothermic reaction and cools the fuel inlet edge of the cell. Due to the exothermicity of the electrochemical process, the outlet gases leave at higher temperature than the inlet temperature of the inlet gases. When endothermic and exothermic reactions are combined in an SOFC stack, a significant temperature gradient across the stack is generated. Simultaneously flow rates are wanted to be minimized both at the fuel and oxygen rich side in order to maximize overall system efficiency. Large thermal gradients induce thermal stresses in the stack which are highly undesired and they entail difference in current density and electrical resistance. The performance and lifetime of a SOC stack can be maximized when as uniform temperature profile as possible over the entire stack can be maintained. Therefore, the problem of thermal management of an SOFC stack exists in reducing thermal gradients enough to avoid unacceptable stresses and to maximize electric efficiency through homogenous current density profile.

It is often necessary in prior art embodiments to protectively coat the flow field plates in order to slow down corrosion of the metal. Generally, there are two corrosion mechanisms that cause aging to solid oxide fuel cells and electrolyser. One mechanism is the formation of an oxide layer, that conducts electricity poorly, onto the metal surface and another mechanism is the settling of chrome compounds evaporating from metal onto the active surfaces of the unit cell and reaction with electrochemically active materials weakening the electrochemical, chemical, electrical conductivity and/or gas permeability properties of the active material. Oxide structures are generally used as protective coatings that on one hand slow down oxidant diffusion onto the surface of the metal and on the other slow down hand diffusion of alloy atoms and compounds through the oxide structure. The price of the protective coating is typically significant within the total costs of the cell stack and cost of the protective coating is influenced by the fabrication process used for the protective coating, the material and the surface to be coated protectively. Additionally it is not preferable to extend the protective coating to areas, which are used to seal the cell stack, because glass, ceramic materials or minerals generally used as sealants can react with the protective coating causing aging effects to the cell stack structures, for example because of increased gas leakages and/or increased undesired electric conductivity.

A SOC module comprises tens up to hundreds of SOC stacks, support structures, thermal insulation, reactant conveying and distribution structures, instrumentation as well as electrical and reactant interfacing towards the application or other modules. As high temperature interfaces are costly, space-consuming and may constitute an ignition source, it is also beneficial to include heat exchanging within the module to lower the temperature of the reactant interfaces. Furthermore, the SOC module needs internal or external means to facilitate safe start-up and shutdown.

The advantage of the SOC is its high performance in the conversion processes. In a small, unit cell tests, such a structure can produce electrical power densities exceeding 2 W/cm2 and still having extremely high energy conversion efficiency compared to competitive technologies such as other electrochemical cell technologies based on low temperature solutions such as polymer electrolyte or alkaline technologies, or other conversion technologies based on Carnot cycles such as turbine or engine technologies. The cell generates heat power densities in the fuel cell mode that are equivalent to the electrical power densities. The current problem with SOC technology to reach this high electrical power densities is that the heat has to be dissipated to the fuel and oxidant streams or transferred via conduction or radiation from the electrochemically active sites in order not to overheat the SOC structure. The heat transfer challenge is pronounced at stack level in which the main heat transfer mechanism is the convective heat transfer to the fuel and air fluids. A SOC stack is composed of a SOC, a flow field plate structure for the fuel, a flow field plate structure for the oxidant, electric contacting structures for the fuel and oxidant, protective coatings for the flow field plate structures and sealing solution preventing assuring reactant gases to flow over the electrochemically active SOC areas. In a SOC stack, a flow field plate that serves fuel to a SOC on its other side, can supply oxidant to an adjacent SOC in the stack. Also, the other flow field plate that supplies oxidant to the same SOC, can supply fuel to a third SOC. This kind of a structure is called a single repeat unit (SRU) structure. In such structural SOC stack typical power densities are between 0.1-0.4 W/cm2. Heat generation together with limited heat transfer properties produce temperature increase and large temperature gradients in the electrochemically active SOC structure. The maximum power density is typically limited in a stack containing not only ceramic cells but also steal based interconnect parts, coatings and sealing solutions by the maximum operation temperature of these parts and materials. The absolute temperature as the gradient can be harmful for the SRU because of issues related to corrosion, chemical stability, decreased mechanical strength properties, increased stress levels etc. The unit cell however could deliver power densities exceeding today's stack values and up to 2 W/cm2 have been reported in the open literature. If the power density could be increased, this would bring down the cost of produced power or per produced cubic meter of chemical species.

SOC in electrolysis mode can be connected with existing industrial processes such as pulp and paper production, steel production, energy production etc that produces high temperature exhaust gases. These exhaust gases may be used to produce steam from liquid water and to superheat the same to the operational temperature of an electrolysis stack. The same exhaust gases may also be used to heat up effectively the SOC stack to its operational temperature and to use in providing heat for the endothermic electrolysis reactions. The exhaust gases typically contain such high concentration of impurities such as sulfur and halogenides that these gases cannot be supplied directly to the electrochemically active elements without extensive gas cleaning processes.

The temperature control in a SOC stack is today controlled mainly by electrical power density, fuel and oxygen side enthalpy flow rates and material selections incl. thickness and thermal conductivity characteristics. A typical solution in polymer electrolyte fuel cell and polymer electrolyte electrolysis stack structures is to supply third fluid which is used for heat transfer and balancing purposes. Typical fluids are water, alcohols and oils. The same solution is not been possible to be used in SOC technology because of technology's high operation temperature exceeding 800° C. At these temperatures, possible fluids that are in liquid form are either poisonous or extremely corrosive.

In prior art document CN1339181A is presented embodiments in which air acts as an oxidant for the fuel cell stack and at the same time acts as a cooling medium that helps to eliminate waste heat generated during operation of a high temperature fuel cell stack operating at about temperature of 1000° C.

SHORT DESCRIPTION OF THE INVENTION

The object of the present invention is to achieve a solid oxide cell system and its operation, in which energy production capacity is increased, energy production efficiency is improved, and also lifetime of the solid oxide cells is extended.

This is achieved by a temperature control system for solid oxide cells, a cell comprising a fuel side, an oxygen rich side, and an electrolyte element between the fuel side and the oxygen rich side and the system comprising a repetitious unit structure for the solid oxide cells. The temperature control system comprises a fuel flow field plate structure for fuel, an oxidant flow field plate structure for oxidant, electric contacting structures for the fuel and the oxidant, a temperature control fluid structure in the flow field plate for a temperature control fluid, the temperature control fluid structure in the flow field plate being located separately between the fuel flow field plate structure and the oxidant flow field plate structure, in a flow field plate (121), and in a liquid form the temperature control fluid comprises at least one of the liquid comprising salt solutions, supercritical fluids and phase changing materials, in a gaseous form of the temperature control fluid the gas is being reacted by at least one of endothermic and exothermic reactions, and the temperature control system comprises sealing means to prevent leakages in the structures and means for controlling operation temperature in the solid oxide cells over 350° C. by optimizing temperature control fluid temperature and the flow rate.

The focus of the invention is also a temperature control method of solid oxide cells. In the method is flown fuel in a fuel flow field plate structure, is flown oxidant in a oxidant flow field plate structure, is formed electric contacting structures for the fuel and the oxidant, is flown temperature control fluid in a temperature control fluid structure located separately between the fuel flow field plate structure and the oxidant flow field plate structure in a flow field plate, and in a liquid form the temperature control fluid comprises at least one of the liquid comprising salt solutions, supercritical fluids and phase changing materials, in a gaseous form of the temperature control fluid the gas is being reacted by at least one of endothermic and exothermic reactions, and is formed sealing structures to prevent leakages in the structures and is controlled operation temperature in the solid oxide cells over 350° C. by optimizing temperature control fluid temperature and the flow rate.

The invention is based on a fuel flow field plate structure for fuel, an oxidant flow field plate structure for oxidant, electric contacting structures for the fuel and the oxidant, a temperature control fluid structure in the flow field plate for a temperature control fluid, sealing structures to prevent leakages in the structures, and the invention is further based on controlling operation temperature in the solid oxide cells.

The benefit of the invention is that costs of a produced electricity and chemicals can be reduced by enabling utilization of higher power densities on the same reaction area.

DETAILED DESCRIPTION OF THE INVENTION

By reducing the operating temperature below 800° C., one can start to utilize for thermal control purpose liquid fluids such as salt solutions, supercritical fluids, phase changing materials and gaseous fluids such as helium. Such a structure requires an additional flow channel structure that will be located between a fuel side and oxidant side of a flow field plate. In between these reactant flows, a temperature control fluid flow is applied, and it is separated from the oxidant and fuel streams. Temperature control fluid composition and the flow rate can be optimized so that the fluid transfers heat in the range of 2 W/cm2. Operation temperatures of the system according to the invention are not restricted below 800° C., but they can vary e.g. between 350° C. to 1000° C. but in startup and shutdown situation also in lower temperatures.

An electrochemical active solid oxide cell can be used as a fuel cell or an electrolyser. A fuel cell produces electricity and heat from various fuels and an electrolysis cell produces chemicals such as hydrogen, methane, ammonia and carbon monoxide from steam, CO2, and nitrogen, electricity and heat. Such a cell that operates as both modes, as a fuel cell and electrolyser, is called a solid oxide electrochemical cell (SOEC) or reversible solid oxide cell (rSOC) or simply a solid oxide cell (SOC).

According to the present invention, the fuel cell or electrolyser stack comprises at least two single repetitious structures as presented an example in FIG. 1. A single repetitious structure comprises at least of one electrochemically active electrolyte element structure including fuel side, electrolyte in between, and oxygen rich side, placed between at least two flow field plates, the other distributing oxygen rich gas in the oxygen rich side of the electrolyte element structure and the other distributing fuel gas in the fuel side of the electrolyte element, and at least one sealing means sealing the gas atmosphere at its intended enclosure. The flow field plate has at least one inlet orifices for fuel gas, temperature control fluid and/or oxygen rich gas and at least one outlet orifices for fuel gas, temperature control fluid and/or oxygen rich gas. The oxygen rich side may be accomplished with so-called open air structure in which no inlet or outlet orifices exist.

Figure 3:
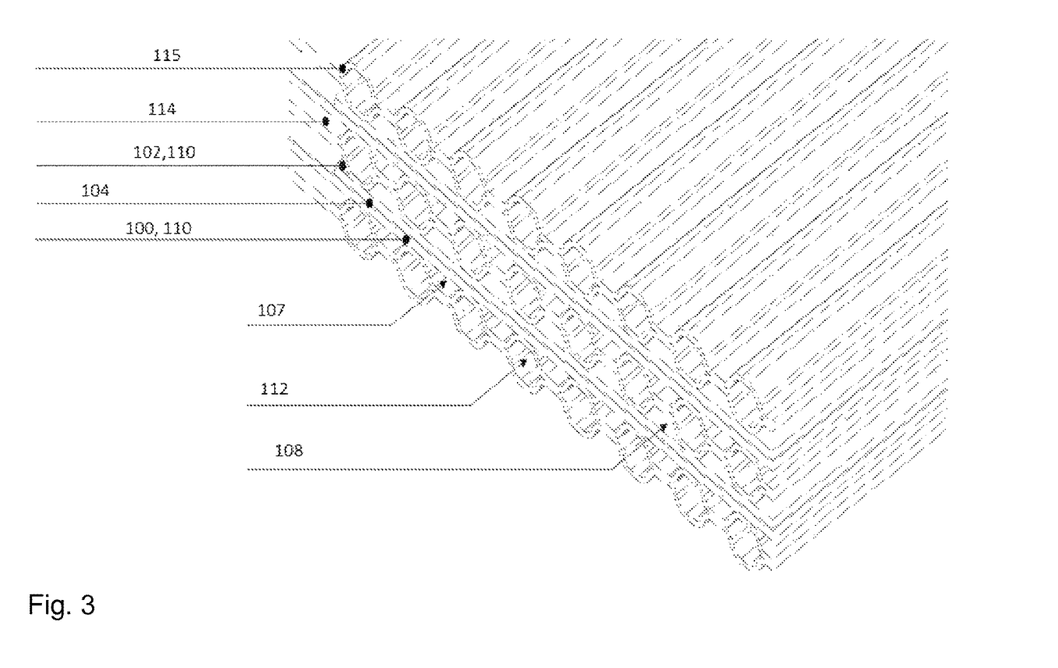
FIG. 3 presents an exemplary cell stack structure according to the present invention.
Figure 6:
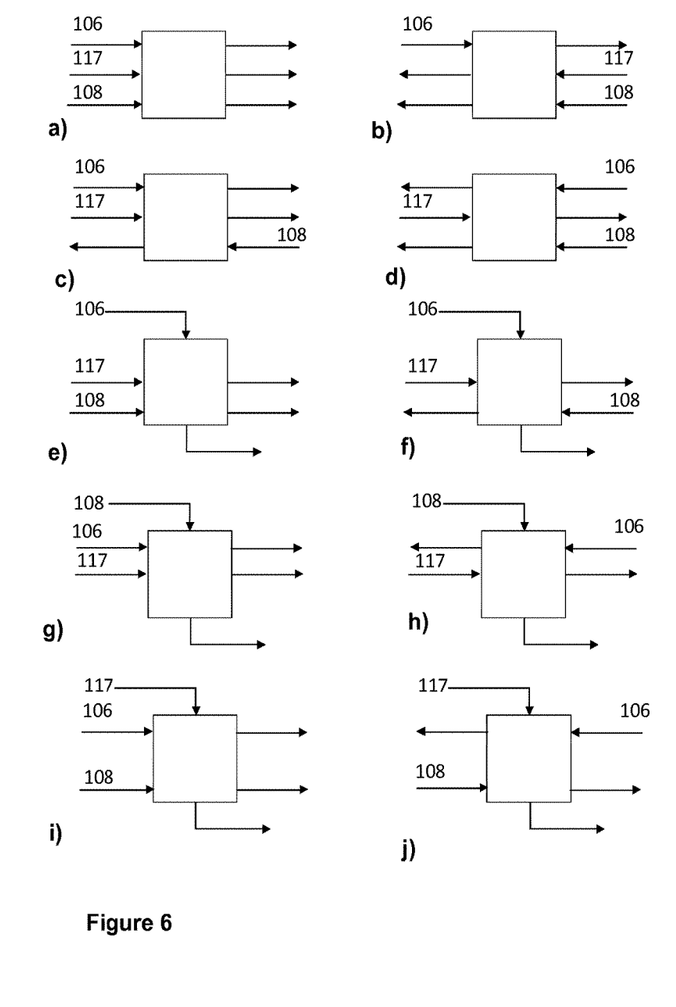
FIG. 6 presents combinations of the flow directions.

The system comprises preferably a repetitious, i.e. a single repeat unit (SRU) structure for the solid oxide cells. In FIG. 3 is presented an example of a repetitious stack 103 structure, wherein fuel 108 flows to the fuel flow field plate structure 107, oxidant 106 flows to the oxidant flow field plate structure 109 and temperature control fluid 117 flows to the temperature control fluid structure 112. The fuel flow field plate structure 107, oxidant flow field plate structure 109 and temperature control fluid structure 112 in the flow field plate 121 can be arranged as co-flow, counter flow or cross flow geometry arrangement or as combination of two or three of those flow geometries of fuel 108, oxidant 106 and thermal control fluid 117 flows. Various examples of different combinations of the flowing directions are described in the exemplary FIG. 6. In the co-flow arrangement (FIG. 6 a) all flows have essentially the same direction. In the counter-flow arrangement (b,c,d) the flow directions differ from each other essentially by 180° whereas in the cross flow arrangement (e, f, g, h, i, j) at least one flow direction differ from other flow directions essentially by 90°.

Figure 2:
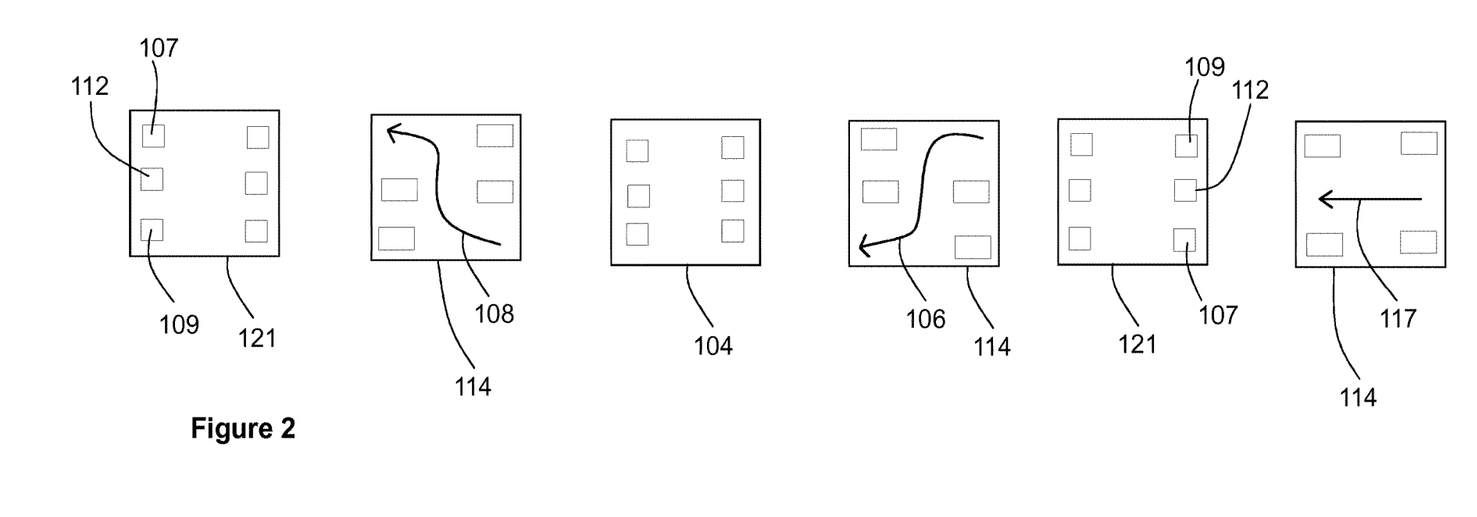
FIG. 2 presents an exemplary arrangement of flow field plates for a fuel cell stack.

FIG. 2 shows exemplary flow field plates 121 of a SOC. A complete fuel cell stack comprises several plates 121 placed on successively each other in a shown manner. The plates in this exemplary embodiment are rectangular and symmetrical. An electrolyte element structure 104 comprising an electrolyte layer between an anode electrode and a cathode electrode is placed between the plates 121 generally in the middle of the plate. The electrolyte element structure 104 may be any suitable electrolyte element structure and is not therefore described herein in any further detail. The flow field plates 121 and the electrolyte element structure 104 are sealed with sealing means 114. The purpose of the sealing means 114 is to ensure that oxidant and fuel are not directly mixed without the fuel cell reactions inside the electrochemically active area, that the fuel and oxidant are not leaked out from the electrochemical cells, that the adjacent electrochemical cells are not in electronic contact with each other, and that oxidant and fuel are supplied to the desired flow field plate planes 121. Two opposing flow field plates 121 and the electrolyte element structure 104 therebetween form a single repetitious structure. The flow field plate 121 is a planar thin plate that is made of metal alloy, ceramic material, cermet material or other material that can withstand chemical, thermal and mechanical stresses that are present in a fuel cell. According to the invention, the flow field plate 121 comprises inflow and outflow orifices placed at the edges of the plate 121. In this example the plate 121 is rectangular and flow orifices are placed on slightly shorter edges. Both of the edges have three inflow and outflow orifices 109 for oxygen rich gas (in following exemplary embodiment: air), and inflow and outflow orifices 107 for fuel and inflow and outflow orifices 112 for thermal control fluid. The oxygen rich gas can be any gas or gas mixture, which comprises a measurable amount of oxygen at the outlet. In the case of electrolysis cell configuration, oxygen rich gas side may not have any feed in or the inlet gas can be non-oxygen gas such as nitrogen, helium or argon. On both of the edges 19 the orifices can be arranged in a sequence that has first fuel 107 then thermal control fluid 112. The surfaces of the first face (in the FIG. 2 top surface) and the second face (below surface, not shown) around the edges of the flow field plate can be shaped to allow efficient sealing and they limit a contoured surfaces in the middle of the flow field plate that has a specific contour for guiding fuel gas 108, air 106 and thermal control fluid 117 over the surfaces of the electrolyte elements 104. It should be noted, that the sealing means 114 that illustrate gas flow routes 106, 108 and 117 in FIG. 2 are also used to refer to a face and a contoured surface 160 of the flow field plate 121 on the opposite side that is facing towards the sealing means 114.

The number of the orifices for arranging the gas flows on a fuel cell stack may vary as well as the way how the gas flows are arranged. The basic idea is that orifices on superposed flow field plates 121 can be arranged so that their positions are matched and the orifices in same line form a gas manifold channel through the stack. Sealing means 114 are used in order to prevent feeding of the fuel, air and thermal control fluid to wrong layers between electrolyte elements and the flow field plates. The sealing means are arranged to surround each orifice on the flow field plate 121. The flow field plate 121 and the sealing elements 114 are used to form ducts (i.e. channels) that go through whole fuel cell stack. The orifices in the flow field plates are superpositioned in order to form such a duct.

The number of the orifice used for gas feed may vary according to the design of the fuel cell. Minimum number might be one inflow orifice for a gas as well as an outflow orifice. Using more orifices allows for more flow patterns but naturally complicates the design. According to one embodiment, the fuel flow, air flow and thermal control fluid can be arranged crosswise to each other. This can be done e.g. by rotating every other flow field plate 90°. The rectangular form described above can be used to simplify manufacturing and assembling processes. However, any desired geometric form can be used such as polygonal, circular, oval, etc.

In FIG. 3 is presented a SOC (solid oxide cell) temperature control system according to the present invention, a cell comprising a fuel side 100, an oxygen rich side 102, and an electrolyte element 104 between the fuel side and the oxygen rich side. The temperature control system comprises a fuel flow field plate structure 107 for fuel, an oxidant flow field plate structure 109 for oxidant and electric contacting structures 110 for the fuel and the oxidant. The system according to the present invention comprises a temperature control fluid structure 112 in the flow field plate 121 for a temperature control fluid. The temperature control fluid structure 112 in the flow field plate 121 can be located separately between the fuel flow field plate structure 107 and the oxidant flow field plate structure 109. The system comprises also sealing structures 114 to prevent leakages in the structures 104, 107, 109, 110, 112. The sealing structures 114 can comprise e.g. welds, soldering, metal bracing, glass bonding, and compressed joints including gasket materials. The temperature control system according to the present invention can further comprise means 116 for controlling operation temperature in the solid oxide cells.

The system according to the present invention can comprise means 116 for controlling the operation temperature in the solid oxide cells e.g. below 800° C. In one embodiment said controlling can be performed by optimizing temperature control fluid temperature and the flow rate. The means 116 can be performed by enthalpy flow control as is presented in FIGS. 4 and 5.

Figure 4:
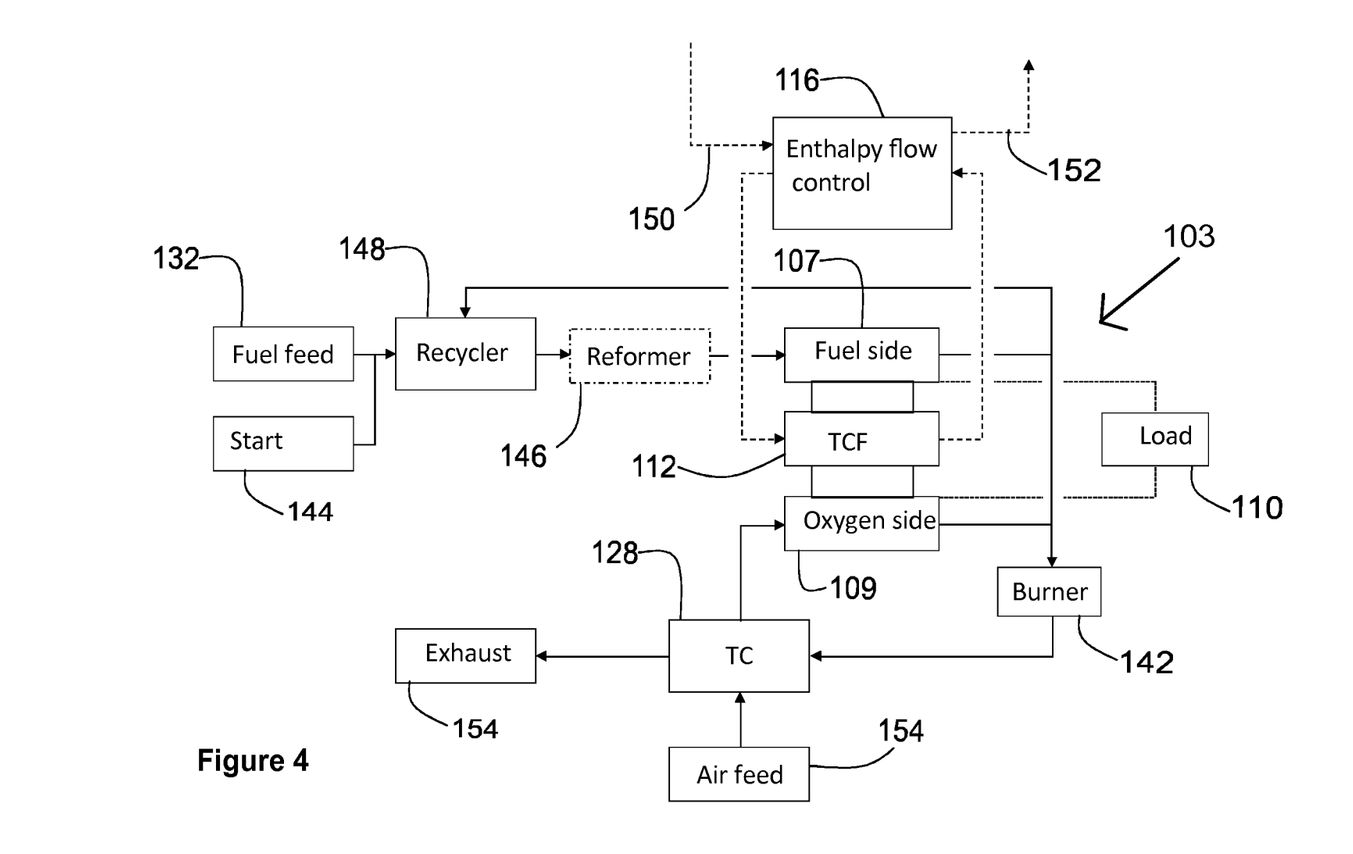
FIG. 4 presents an exemplary fuel cell system according to the present invention.
Figure 5:
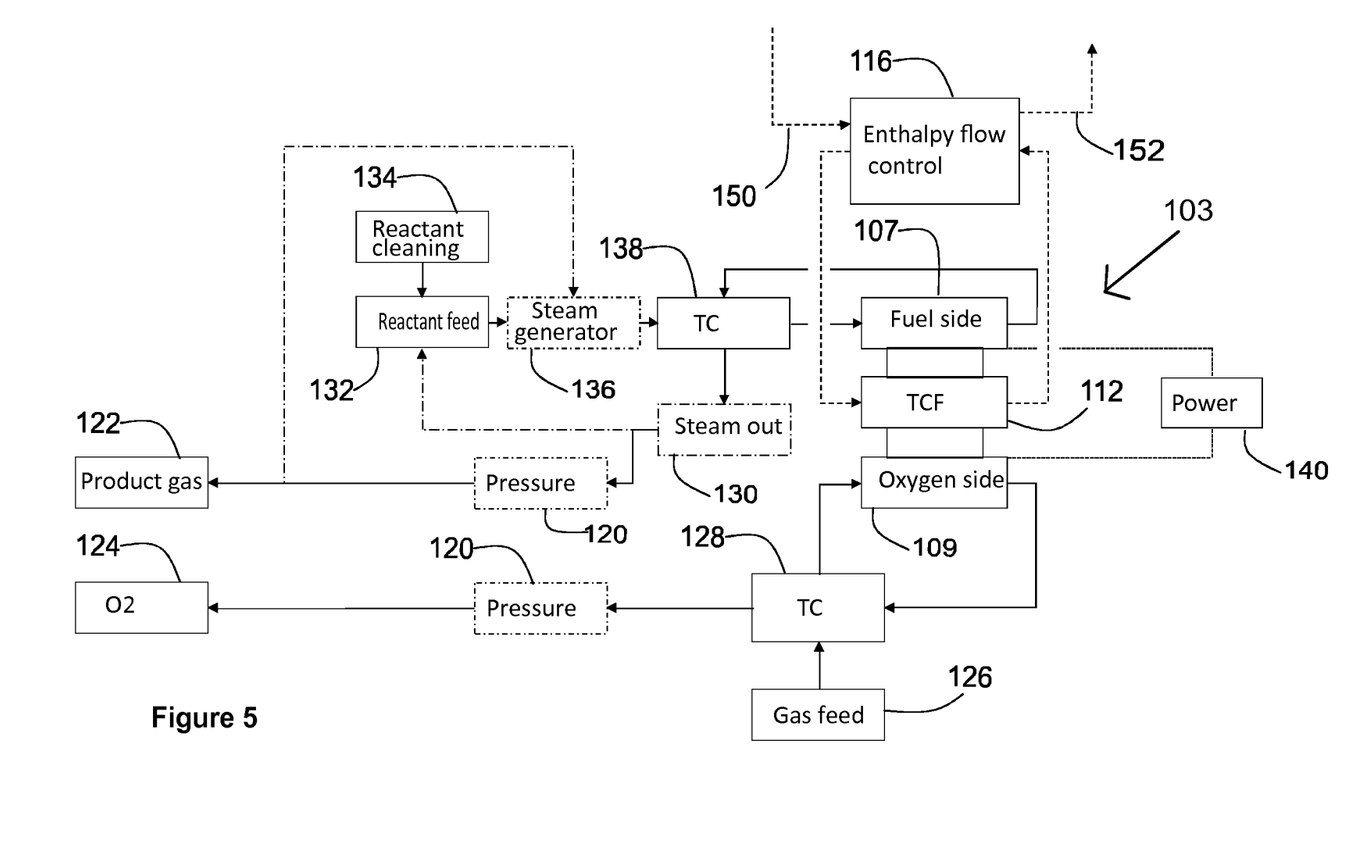
FIG. 5 presents an exemplary electrolysis cell system according to the present invention.

FIG. 4 presents an exemplary fuel cell (SOFC) system according to the present invention and FIG. 5 presents an exemplary electrolysis cell (SOEC) system according to the present invention.

The sum of all enthalpy streams in the system is zero. If only one enthalpy stream is unknown it can be calculated based on others. In one embodiment the enthalpy streams can be calculated based on measurements which are already needed to other purposes in the SOC (SOFC or SOEC) unit control. Gas composition including methane CH4 content and its measurement is in important role when calculating and controlling enthalpy flows in the SOFC system. The known enthalpy feeds and the utilized measurements in a SOFC anode recycle type unit can be: A) air feed in measurements, such as temperature, flow amount and humidity measurement of the air feed-in, B) fuel 132 and start gas 144 flow in measurements, such as flow amount and temperature measurements of the fuel flow 132 in, C) exhaust feed out information, which preferably is a combination of exhaust temperature measurement information and process calculation of composition and flow volume. Process calculation can be performed from system in flows for example by assuming that all fuel is burned in the burner 142. D) Electrical power production information 110, which can be based on voltage and/or electrical current measured, E) system heating information, which can be based for example on power consumption measured from at least one electrical heater 128, F) fan and/or compressor heating information of gas lines 132 and 154, which information can be based for example on efficiency information provided for example from manufacturer and/or on power consumption measured in the at least one fan and/or compressor, G) heat loss information 103, which can be calculated, for example as is described in more detail later in this description, H) recycle loop gas concentration information, temperature measurement and flow rate measurement 148, and I) flow rate and temperature of the enthalpy flow control fluid 116, 150, 152.

The means 116 for controlling the operation temperature in the solid oxide cells are configured to minimize energy which is fed into the cell system by minimizing used fuel and air amount. This can be achieved by maximizing power density per area in SOC reactions in which heat transfer is maximized to the temperature control fluid. Thereby specific heat capacity of the temperature control fluid material is maximized by using at least one of liquid fluids, phase change materials, gases having high specific heat capacity and reactive gases, e.g. gases that are reformed. The specific heat capacity can also be increased by maximizing heat transfer from SOC element to the thermal control fluid by positioning the fluid near electrochemically active reaction interface. Furthermore, heat transfer area can be increased, thickness of the structure can be maximized, size of flow channels can be maximized and form of flow channels can be optimized to maximize the specific heat capacity. Also, flow characteristics can be designed to achieve high heat capacity characteristics of the flow by forming e.g. a turbulent flow. Form of flow can be modified e.g. by a specific form of the flow channel.

Next is described a preferred an exemplary method for determining enthalpy balance of a fuel cell system, in which method is fed fuel to the fuel cell system, and is performed anode 100 side recirculation flow of reactants. Enthalpy feed in flow information is formed from information gained by performing one or more of following method steps: is performed air feed in measurements to form air feed in information, is performed water flow in measurements to form water flow in information, is measured exhaust feed out to form exhaust feed out information, is measured electrical power to form electrical power production information, is measured temperature conditions to form heating information of the fuel cell system, and is formed heat loss information of the fuel cell system. Said measurements can be performed, at least mainly, by utilizing common and relatively cheap measurement equipment without high accuracy demands. Enthalpy feed in flow information can be provided by gaining information about gas lines for example from fan, compressor, etc. Exhaust feed out information can be provided by calculating information from fuel cell system in flows on the basis of an assumption that essentially all fuel is burnt in the afterburner.

Further, in the method can be measured power consumption of at least one electrical heater to form heating information of the fuel cell system.

On the basis of the formed enthalpy feed in flow information is accomplished information of enthalpy flows to provide enthalpy balance information of the fuel cell system by summing information of enthalpy flows, and by detecting that sum of summed information of enthalpy flows is zero or essentially near to zero. Methane content information of the fuel feed is determined on the basis of said enthalpy balance information gained through summing of information of the enthalpy flows. Information of one enthalpy flow can be determined by calculating it on the basis of the summed information of enthalpy flows.

In the exemplary fuel cell system according to the present invention as presented in FIG. 4 temperature control fluid 117 (FIG. 1) is flown to the temperature control fluid structure 112. Chemical properties of the temperature control fluid 117 are described more detailed in the next chapters. The fluid 117 can be controlled by the means 116 for controlling temperature, pressure and flow rate. An external control fluid 150 can be flown to the means 116. The external control fluid 150 has such chemical properties and temperature which are needed to achieve objective chemical properties and temperature of the thermal control fluid 117 and thus, to achieve an objective operational temperature of the fuel cell system. Also, a controlled and desired outflow fluid 152 can be flown from the means 116, if needed. The means 116 optimizes temperature control fluid 117 temperature and, in addition to that, means 116 can also optimize the flow rate, because it also affects to the operational temperature of the fuel cell system. Outflow stream 152 con be further connected to any external or internal system utilizing the heat. Internal systems may include temperature control units such as heat exchangers for heating the processes gases. External systems may include district heating networks, thermodynamic cycles such as power cycles or heat pump cycles.

In FIG. 4 is presented electrical load 110 of the stack 103 structure. Fuel feed and control 132 feeds fuel to the fuel cell system. Start control 144 performs the start-up operations of the system. Fuel is fed to a recycler 148 for performing recycling operations of the fuel. The gas recycling function can be conducted by a mechanical pump or a compressor type solution or an ejector solution. A reformer 146 receives fuel for performing reforming reactions to the fuel in order to reform the fuel to a suitable form to be fed to the fuel side 107 (anode side) of the fuel cell system. Reforming reactions are typically in equilibrium defined by the inlet flow rates, concentrations, pressure, temperature, and catalyst type used. In another embodiment, for example, when ammonia NH4 is used as fuel, the reactions are not reforming reactions but cracking reactions, so the reformer is exemplary in FIG. 4.

Air feed control 154 feeds oxygen to the fuel cell system through temperature control 128 to the oxygen side 109. In the outlet flow there is a burner to perform afterburning reactions to the exhaust gas, which is exhausted through the temperature control 128 to the outlet 156.

Not only the described means 116 and related fluids 117, 150, 152, but also the other fuel system pressure and temperature conditions can be controlled so that the objective operational temperature is achieved more effectively with the aid of means 116 and the related fluids 117, 150, 152.

In FIG. 5 is presented an exemplary electrolysis (SOEC) system according to the present invention, in which a temperature flow and the related fluids 117,150, 152 operates similarly as described related to FIG. 5, but the temperature is controlled on basis of electrolysis mode conditions to achieve an objective operational temperature of the electrolysis system. Power unit 140 provides electricity to the stack 103. Gas (e.g. air, oxygen $O_2$, carbon dioxide CO2, nitrogen N2) is fed from the gas control unit 126 through the temperature control 128 to the oxygen side 109. Reactant (i.e. water H2O, carbon dioxide CO2) feed control 132 receives water or mixture of water and carbon dioxide from reactant cleaning unit 134 and feeds the steam generator 136 for generating steam. The generated steam is fed through a temperature control unit 138 to the fuel side 107. From the fuel side is performed steam circulation through the temperature control unit 138 and further to a product gas outlet 122 through a possible pressure control unit 120. The product gas is e.g. hydrogen H2, ammonia, methane and/or carbon monoxide. In one embodiment steam can also be recirculated to the reactant feed control unit 132 or to the steam generator 136. From the oxygen side 109 oxygen is fed through the temperature control unit 128 to the oxygen outlet 124 through a possible pressure control unit 120.

Not only the described means 116 and related fluids 117, 150, 152, but also the other electrolysis system pressure and temperature conditions can be controlled so that the objective operational temperature is achieved more effectively with the aid of means 116 and the related fluids 117, 150, 152.

The temperature control fluid can be in liquid form comprising for example salt solutions and molten metals. Molten salts based on fluoride (e.g. FLiNaK), chloride (e.g. MgCl2-KCl), carbonate (e.g. 60% Li2CO3 and 40% K2CO3 or Na2CO3) and nitrate (e.g. NaNO3-KNO3 [40-60 wt %], LiNO3-NaNO3-KNO3 [30-52-18 wt %]) compounds and molten metals such as wood's metal and lead-bismuth eutectic alloy are examples of heat transfer fluids that can be used at elevated temperatures exceeding 350° C. A heat transfer fluid can also be a gaseous compound that may be inert gas such as argon, helium, nitrogen. The heat transfer fluid can also be a reactive compound or mixture of a gaseous solution composed from dual, ternary or more complex gas mixtures that may react chemically in temperature region between ambient temperature and 900° C. that are typical operational temperature regions for solid oxide oxide cell processes including not only the electrochemically active cell but also the after burner reactors converting the unused chemical energy into heat. Such gas mixtures may include in dual atomic system for example nitrogen atoms (N), hydrogen atoms (H) and combination of these in form of nitrogen molecules (N2), hydrogen molecules (H2) ammonia (NH3), in ternary system carbon (C), hydrogen (H) and oxygen (O) atoms and combination of these in form of methane (CH4), carbon monoxide (CO), carbon dioxide (CO2), water (H2O) and hydrogen (H2). The temperature control fluid may also be a phase change material that undergo phase change from solid phase into molten or liquid phase, from molten or liquid phase to gaseous phase, or from solid phase to gaseous phase. The solid-liquid phase change materials may include various salt solutions including stabilizing agencies for example eutectic K2CO3-Na2CO3 salt with e.g. MgO as a form stabilizer, encapsulated and microencapsulated materials such as potassium nitrate and Al—Si alloys. A temperature control fluid may also be a phase change fluid that is in critical, super or ultra-supercritical state. Such fluids that may be used are for example carbon dioxide, water, and hydrocarbons such as alkanes, cycloalkanes, and benzenes and their mixtures. In principle an effective heat transfer fluid is a gas, liquid or solid or their combination that takes part in heat transfer for cooling on one side of a process, transporting and storing thermal energy, and heating on another side of a process.

Different heat transfer fluids may be coupled with different thermal processes. For example, molten salts, molten metals and phase change materials are being used and developed for solar power applications in which radiative heat from sun is used to heat up the molten substant or phase change material. In such process, a solid oxide electrolyser may be coupled with the temperature control fluid to the enthalpy control unit 116 that is a concentrated solar power plant and the electrochemical process takes place in endothermic reaction zone enabling over 100% conversion efficiency for hydrogen production from steam. In such an application, heat transfer fluid is heated in an enthalpy control unit 116 by concentrated sun light and releases heat for the electrochemical reactions in TCF 112 for the fluid streams at fuel side 107 and oxygen rich side 109. Solar power application operated as an enthalpy control unit 116 may also be coupled though heat transfer fluid with a fuel cell in which case the fuel cell may be operated at elevated power density as the molten solution or phase transfer fluid in TCF 109 enhances heat transfer compared to typical solid oxide fuel cell configuration not equipped with temperature control fluid circuit. As an example the specific heat capacity of a KNO3 and air is the same order of magnitude (~1 kJ/kg·K) at 750 K but the density difference at the same temperature is about four orders of magnitude higher for the molten solution (~1700 kg/m3) as for air (0.5 kg/m3). Thus, the ability to transfer heat with same volume of substance in salt solution is also about four orders of magnitude higher as with air. Latent heat of typical phase change materials (a mixed chloride salt of anhydrous calcium chloride and sodium chloride) is in the range of 90 kJ/kg enhancing the heat transfer radically.

Example of a process in which inert gas or critical fluid may be coupled with a solid oxide cell stack is e.g. a high temperature nuclear reactor. In such reactors, helium or carbon dioxide may be used as the heat transfer fluid which is coupled indirectly through a heat exchanger or directly in an enthalpy control unit 116 to an electrolyser or fuel cell process introducing either a heating function or a heat stabilization function for the electrochemical device through TCF 112, respectively. If such a process is made with a help of a liquid-gas phase change fluid, process is called Rankine cycle. Other phase change fluid cycles are e.g. Kalina cycle, hygroscopic cycle and regenerative cooling. In addition, refrigeration cycles may be coupled either with or without phase change fluid with solid oxide cell stack structure via temperature control fluid.

Example of a process in which chemical reaction may be used for heat balancing purposes may include e.g. a Haber process. In this loop, enthalpy control unit 116 is used to produce ammonia from nitrogen and hydrogen. The process requires heat that a fuel cell reaction is producing. In TCF 112, ammonia is converted into nitrogen and hydrogen. This reaction is endothermic and thus consumes heat and thus helps the heat balancing of the fuel cell reaction. When enthalpy flow diagram is changed one can produce heat for electrolysis reaction and dissipate that into the decomposition reaction of ammonia. Other similar chemical reaction loops can be also utilized including e.g. steam reforming-methanation reaction loop for methane or water gas shift reaction loop for carbon monoxide, carbon dioxide and water. The advantage of utilizing chemical reactions in heat transfer purposes is associated with the high reaction enthalpy of these reactions. E.g. Haber process (−90 kJ/mol), water gas shift reaction (−40 kJ/mol) and methanation reaction (−206 kJ/mol) enthalpies are all exothermic and thus can produce heat for the electrochemical processes and then balance the exothermic electrochemical reactions in TCF 112 by their reverse endothermic reactions. In such configurations, a catalytically active substance inside TCF 112 is seen advantageous. Such a catalyst may be applied into the structure by a coating deposited on the surface of a channel 112 or as separate catalyst particles inserted to the gas channel 112.

The system according to the present invention can comprise protective coatings 115 for the flow field plate structures on metallic interconnect structures, e.g. flow field plate structures made from steel structure. The protective coatings can be applied on the air side 108, fuel side 107 and temperature control fluid side 117. The coatings can preferably be selected according to characteristics of at least one of fuel, oxidant, thermal control fluids and metallic interconnect structure and material. In some embodiments protective coatings 115 have catalytic characteristics.

The greatest potential for protective coatings 115 on the air side of the solid cell structure are ceramic material with the generic formula of spinel $(A,B)_3O_4$, where A and B are metallic cations. The present interest in SOFC use is focused on $Mn_{2-x}Co_{1+x}O_4$ based spinels (where $x=0 \ldots 1$) as these materials obtain good Cr-barrier properties against migrating Cr-species and formation of more chemically stabile $(Mn,Co,Cr)_3O_4$ spinels with enhanced electrical conductivity properties compared to Cr oxide layer forming on the steel structure without any protective coating structure. Mn—Co—O spinels have cubic and tetragonal crystal structures when the stoichiometric factor x is between 0.3-0.9 in the $Mn_{1+x}Co_{2-x}O_4$ system. $Mn_{2-x}Co_{1+x}O_4$ spinels have acceptable electrical properties with electrical conductivities varying from 15 . . . 68 S/cm in a temperature range of 700 . . . 800° C., in terms of the chemical composition. Iron doping in small amount, by obtaining $MnCo_{2-x}Fe_xO_4$, most likely enhances electronic conduction. Doping causes the formation of $(Co^{2+}, Mn^{2+}, Fe^{3+}) (CO^{2+}, Co^{3+}, Mn^{3+}, Mn^{4+}, Fe^{2+}, Fe^{3+})_2O_4$ cation distribution in the spinel system, as Co cations have a stronger tendency to occupy tetrahedral sites compared to Mn cations, and Fe cations have a lower tendency to occupy tetrahedral sites than Co and Mn cations. Due to the presence of mixed valence states at octahedral sites in the $(A,B)_3O_4$ spinel system, the activation energy $(E_a)$ for $MnCo_{1.9}Fe_{0.1}O_4$ is 0.38 eV, i.e. lower than the $E_a$ of $MnCo_2O_4$, which is 0.44 eV. As a result electronic conductivities of 38 . . . 72 S/cm for $MnCo_{1.9}Fe_{0.1}O_4$ at 800° C., and 85 S/cm for $MnCo_{1.8}Fe_{0.15}O_4$ at 800° C. in air can be obtained. Several other spinels, such as $CuFe_2O_4$, $CuMn_2O_4$ show great interest as well, obtaining high electrical conductivities. Spinel materials can be further doped with rear-earth metals such as Ce, Y that have been shown to further stabilize the coating structure by increasing the bonding strength of the coating and steel and to decrease the chromium mobility in the coating structure. Same materials can be used also to protect the fuel side of the solid oxide structure to prevent oxide scale growth and diffusion of nickel from the active fuel electrode to the metal structure.

A contact coating 115 is applied between the active electrode 100, 102 structure and the cell structure plate 121 in order to decrease the contact losses between the interfaces and to increase the lateral conductivity of the coating solution 115. The contact coating material is typically the same as the active electrode material, i.e. on the air side coating material is typically perovskite structures $(ABO_3)$ such as $(La,Sr)MnO_{3-\delta}$, $(La,Sr)(Co,Fe)O_{3-\delta}$, $(La,Sr)CoO_{3-\delta}$, or has otherwise high electrical conductivity value, low contact resistance to the active electrode layer and high chemical stability such as $La(Ni,Fe)O_{3-\delta}$, $Sr(Ti,Fe)O_{3-\delta}$, and on fuel side most commonly used contact material is nickel deposed in form of NiO but also other materials such as titanates can be used for the purpose. The electrical conductivity has to be higher for the used contact material compared to the protective coating material in order that to be affective. E.g. $(La,Sr)CoO_{3-\delta}$, has electrical conductivity between >1000 S/cm, $La(Ni,Fe)O_{3-\delta}$ around 300 S/cm and Ni>>1000 S/cm in the typical solid oxide cell operating temperature range all having around order of magnitude higher conductivity as for typically used protective coating spinel materials. Typical layer thickness of the contact coating 162 is from few micrometers up to tens of micrometers. Microstructure properties and surface properties of the contact coating 115 layer may vary according to the active electrode surface structure in order to maximize the contact points and bonding between the contact layer 115 and one of the active electrode 100, 102 structure.

The temperature control fluid structure may be coated with standard industrial oxide metal coatings including e.g. aluminum oxide, titanium oxide, zirconium oxide, yttrium oxide, cobalt oxide, copper oxide, manganese oxide, iron oxide, chromium oxide, silicon oxide, nickel oxide and their compounds. These may react with the temperature control fluid solution resulting in e.g. LiAlO2 if the coating is made from aluminum oxide and Li2CO3. The temperature control fluid structure may also contain catalytically reactive compounds and structures that may be selective for different chemical processes. The coatings can be applied on the metallic interconnect surface by any applying method including e.g. slurry methods, physical and chemical deposition processes and high temperature deposition processes with and without reactive sub-processes. In the case of a catalytically active structure, the catalyst can be also in form of separate particles in the gas fluid channel 112.

The invention claimed is:

1. A temperature control system for a repetitious unit structure of solid oxide cells, each solid oxide cell including a fuel side, an oxygen rich side, and an electrolyte element between the fuel side and the oxygen rich side, and the temperature control system comprising:
  a fuel flow field plate structure for fuel;
  a flow field plate structure for oxygen rich gas;
  electric contacting structures for the fuel and an oxidant;
  a temperature control fluid structure in a flow field plate for a temperature control fluid, the temperature control fluid structure in the flow field plate being located separately between the fuel flow field plate structure and an oxidant flow field plate structure in a flow field plate, wherein the temperature control fluid is one of a liquid form or a gaseous form, wherein the liquid form of the temperature control fluid includes at least one liquid containing salt solutions, supercritical fluids and phase changing materials, and wherein the gaseous form of the temperature control fluid is a gas configured to react in at least one of an endothermic reaction and an exothermic reaction,
  sealing structures configured to prevent leakages in at least one or more of the fuel flow field plate structure, the flow field plate structure, the electric contacting structures, and/or the temperature control fluid structure; and means for controlling operation temperature in at least one solid oxide cell over 350° C. by changing at least one of a temperature control fluid temperature and a flow rate.

2. The temperature control system in accordance with claim 1, wherein the temperature control fluid is in gaseous form.

3. The temperature control system in accordance with claim 1, comprising:

protective coatings for flow field plate structures made from a steel structure, the protective coatings being selected according to characteristics of fuel, oxidant and thermal control fluids.

4. A temperature control method of solid oxide cells, the method comprising:

flowing fuel in a fuel flow field plate structure;

flowing oxidant in an oxidant flow field plate structure having electric contacting structures for the fuel and the oxidant;

flowing temperature control fluid in a temperature control fluid structure located separately between the fuel flow field plate structure and the oxidant flow field plate structure in a flow field plate, wherein when the temperature control fluid is in a liquid form, the temperature control fluid includes at least one liquid containing salt solutions, supercritical fluids and phase changing materials, and wherein when the temperature control fluid is in a gaseous form, the temperature control fluid is a gas which reacts in at least one of an endothermic reaction and an exothermic reaction; and controlling operation temperature in the solid oxide cells over 350° C. by changing at least one of a temperature control fluid temperature and a flow rate, wherein sealing structures prevent leakages in at least one or more of the fuel flow field plate structure, the oxidant flow field plate structure, the electric contacting structures, and/or the temperature control fluid structure.

5. The temperature control method in accordance with claim 4, wherein the temperature control fluid is in gaseous form.

6. The temperature control method in accordance with claim 4, wherein each fuel flow field plate structure is made from a steel structure, and is protected by protective coatings which are selected according to characteristics of fuel, oxidant and thermal control fluids.

7. The temperature control system according to claim 1, in combination with a repetitious unit structure of solid oxide cells, each solid oxide cell comprising:

a fuel side;

an oxygen rich side; and an electrolyte element between the fuel side and the oxygen rich side.

\* \* \* \* \*